July 15, 1941.  E. C. WELLS ET AL  2,249,339
DETACHABLY CONNECTED PUMPING ASSEMBLY FOR AIRCRAFT
Filed July 19, 1938  2 Sheets-Sheet 1

Edward C. Wells  Inventors
Wellwood E. Beall
By
Charles L. Reynolds
Attorney

July 15, 1941.  E. C. WELLS ET AL  2,249,339
DETACHABLY CONNECTED PUMPING ASSEMBLY FOR AIRCRAFT
Filed July 19, 1938  2 Sheets-Sheet 2

Edward C. Wells
Wellwood E. Beall
Inventors
By Charles L. Reynolds
Attorney

Patented July 15, 1941

2,249,339

UNITED STATES PATENT OFFICE 2,249,339

DETACHABLY CONNECTED PUMPING ASSEMBLY FOR AIRCRAFT

Edward C. Wells and Wellwood E. Beall, Seattle, Wash., assignors, by mesne assignments, to Boeing Aircraft Company, Seattle, Wash., a corporation of Washington Application July 19, 1938, Serial No. 220,033

8 Claims. (Cl. 137—78)

There are, aboard aircraft, pressure systems for the operation of various instrumentalities. There are, for instance, a plurality of deicer boots applied to the leading edges of airfoil surfaces and the like. The proper functioning of the system to supply and relieve pressure in these deicer boots is essential to the safety of the airplane and its passengers, whenever icing conditions are present.

There are also, upon aircraft, vacuum systems for the supply of suction, or, as it may be conceived, of air under negative pressure, to supply various instrumentalities aboard the aircraft, such as the directional gyro or the gyro in the automatic pilot. Again, for proper functioning of the aircraft in the manner intended, it is essential that the vacuum system operate smoothly and without failure.

Where the word "instrumentalities" has been or is hereafter used in this specification, it will refer to any device which is operated or is suitable to be operated either by pressure or by vacuum, as for instance the deicer boots and the gyros referred to above.

Usually each such system is independent of the other, and each system is composed of a plurality of more or less independent elements independently mounted and distributed about the aircraft. For instance, the positive pressure system will frequently include an air pump located adjacent one of the propelling engines of the aircraft, or adjacent an auxiliary power plant in the wing, if such an auxiliary plant is provided, and elsewhere upon the airplane, usually in a central spot, is an automatic motor-driven distributor valve connected to the several deicer boots, and at another point upon the aircraft, usually adjacent the pilot's or copilot's station, or adjacent the station of an engineer officer, is a control valve to govern the turning on and off of the deicer. There are further elements in the system, such as oil separators, system check valves, pump check valves and relief valves, a test T, gauges, and the like, some of which may be associated or installed nearby one of the other units; for instance, the pump check valve and relief valve may be built into or installed adjacent the pump. Largely, however, these various components of the system are installed in separate places about the aircraft, conveniently to other devices with which they cooperate, as the pump to the power plant, and the control valve to the pilot, as seems essential, but not conveniently to each other. A similar situation prevails with respect to the vacuum system.

It does appear most logical to dispose the pump adjacent the power plant, from which the pump, among other facilities, is driven, and since the control valve can not well be located adjacent the power plant, and no end would be advanced by so locating it and then connecting to it a distant control extended to the pilot's station, it seems most logical to locate the control valve adjacent the pilot. Like considerations seem to impel location of other components of such a system at other locations, separated from the control valve and from the pump, but all connected by tubing or other conduit means. This is the plan that has been followed, yet while it seems logical and has been accepted practice, we have found that the supposed advantages of such a scattered system are not so great as they had seemed, or are actually disadvantages; we have found that by collecting all the heretofore scattered components in one place, by mounting the composite unit in a vibration-proof mounting, and by making the unitary, collected system removable and replaceable as an unit merely by disconnection and connection of conduits, advantages may be gained which are not immediately apparent, and which outweigh the seeming disadvantage, thereby entailed, of adding to the system the weight of a motor or like prime mover, not required in the scattered system. Indeed, where an auxiliary power plant is used, a motor driven vacuum pump and a deicer pressure pump would probably be used, regardless of the system arrangement, so that the present unitary system will suffer no penalty of additional weight in such case.

By reason of the manner in which the component parts of such systems have been installed, it is a very difficult matter to locate and correct any malfunctioning within the system, and because of the separation of the parts of the system, the usually rigid mounting of each such part upon the aircraft structure, and their connection by lines of metal tubing, subject to vibration and the possibility of failure at many points and at each of many joints, there is a very real danger that the system may fail in use. Moreover, from the service standpoint, it is practically impossible to test the system as a whole to correct malfunctioning of the system without placing the aircraft out of service and laboriously tracing trouble from one component part to another. Even if malfunctioning of a single component part or element of the system is discovered and corrected, it is not safe to assume that the system will operate properly. Some other component part may also be functioning improperly, or with one theretofore malfunctioning part now functioning properly, the altered relationship of this part to other parts in the system may still cause malfunctioning of the system as a whole.

Standardization and quantity production, which are recognized as essential for military procurement, are scarcely possible when the individual parts of the two systems, or even of each individual system, must be individually installed and connected in each individual airplane, or conformably to changed requirements of different models or types of airplane. Servicing requirements are even more exacting in military airplanes, for each such airplane which must be grounded for servicing is the equivalent, for the time being, of an airplane which has been shot down; yet a military airplane which can not find its objective and return, or which can not keep up with others, because of malfunctioning of such systems, is a liability rather than an asset.

It is, therefore, a principal object of the present invention to increase the safety of such systems, to simplify them, to protect against failure from vibration, and to add to the ease of installing, servicing and maintaining them, and all these objects are forwarded by concentrating the components of the systems at one point, carrying them all upon a single support or within an unitary housing, carried upon resilient shock mounts, and making it possible to remove such a system as an unit by simple disconnection of the distribution lines from the housed system, replacing the defective system by a completely different system, which as an assembly and as to its individual parts has been thoroughly tested, so that it may be assured that the system will operate when thus replaced.

It is a further object to apply these principles to a system which may function as a pressure system alone or alternatively to a system which may function as a vacuum system alone, or to a combined pressure and vacuum system.

With these general objects in mind, and others as will appear hereafter, our invention comprises the novel arrangement of the parts relative to each other and relative to distribution lines and instrumentalities aboard an aircraft, all as shown in the accompanying drawings, described in this specification, and as will be more particularly pointed out by the claims which terminate the same.

In the accompanying drawings our invention is shown embodied in illustrative forms, the showing being largely diagrammatic.

Figure 1:
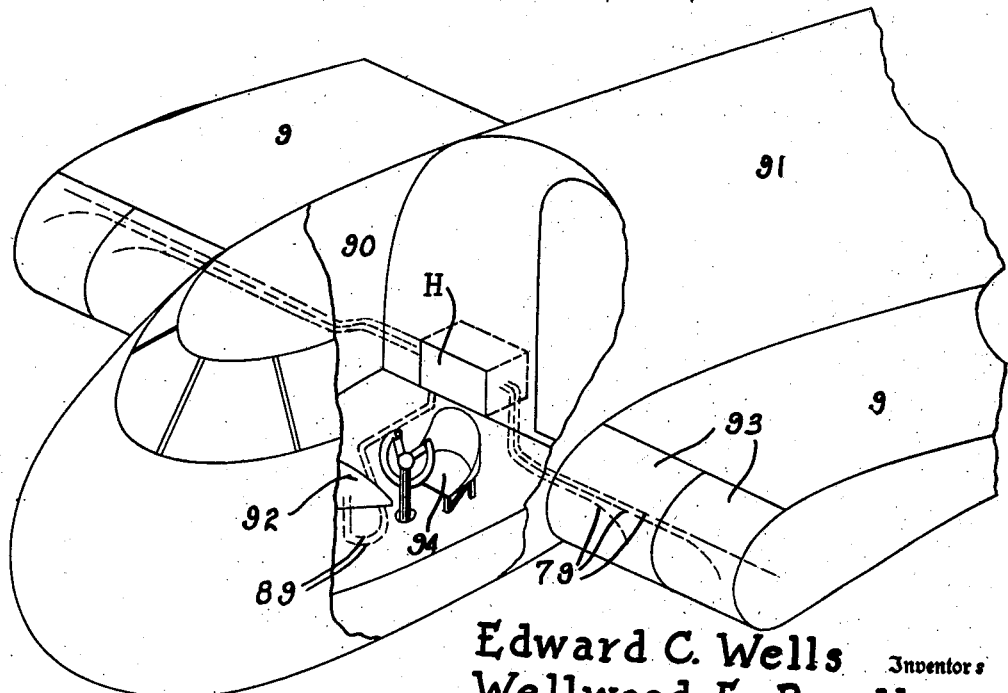
Figure 1 is a perspective view of a part of an airplane, showing such a system installed therein and connected to various and different instrumentalities.

In Figure 1 is shown the pilot's seat 94 within the control compartment 90 of an airplane having the fuselage 91 and wings 9. The instrument board is indicated at 92, wherein may be contained one or more of the vacuum-operated instrumentalities. The vacuum distribution lines 89 are shown leading to the instrumentalities on the instrument board 92. The leading edges of the wings 9 are shown as provided with deicer boots 93, which are inflated and deflated periodically by air pressure, when their use is required, and the pressure distribution lines 79 are shown leading to these deicer boots. These deicer boots constitute pressure-operated instrumentalities.

Figure 3:
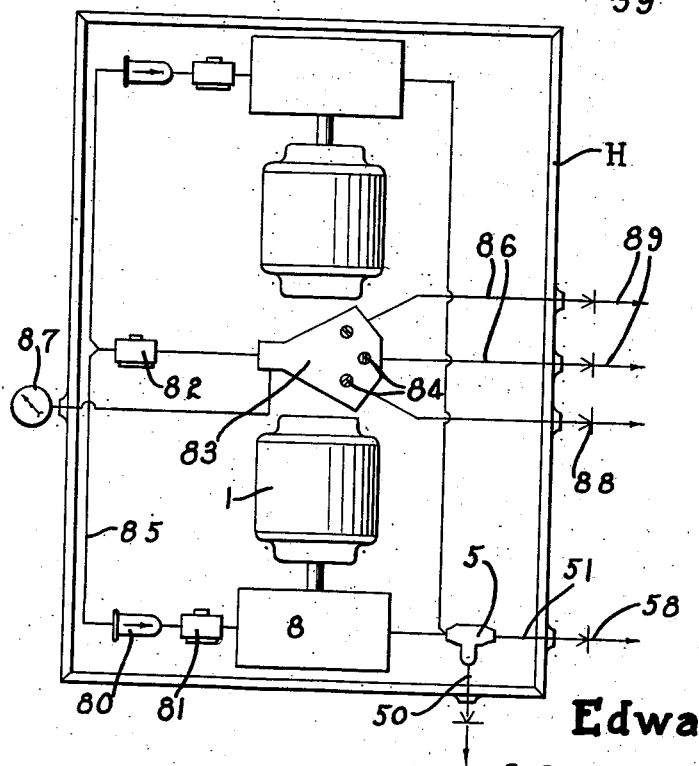
Figure 3 is a similar diagram showing the system arranged for vacuum or negative pressure operation.

The vacuum system is shown in Figure 3. A suction pump 8 is driven by a motor 1, shown as an electric motor, though any suitable prime mover may be employed for the purpose. Generally associated closely with or built into the pump 8, but shown separately, are the pump check valve 80 and relief valve 81. For safety it is customary to supply two such pumps and motors, both of which may operate at the same time under reduced loads, or one of which may be used for stand-by purposes only. Either of them should be capable of carrying the entire load, in case of failure of the other. Each such pump is connected by the suction line 85 and through a system relief valve 82 to a header or suction distributor head 83, from which branch the individual suction lines 86, which are arranged to be connected to and disconnected from the suction distribution lines 89 installed upon the airplane. These connectable couplings are diagrammatically indicated at 88. To regulate independently the suction to each of the several lines 86 and the corresponding lines 89, needle valves or the like may be employed in the header 83, these being indicated at 84. A suction gauge is indicated at 87, connected to the header 83.

The air withdrawn from the system by the pump 8 is discharged, usually through an oil separator 5 and the line 51, and if it is not to be permitted to discharge freely, but only at some particular point, it may be connected through a disconnectable coupling 58. The oil, which enters the system through the necessity for lubricating the pump, if permitted to discharge with the air, would prove objectionable, either through discharging it into the space within the aircraft, or, if discharged exteriorly, it would tend to mar the external appearance of the aircraft. It is therefore drained off through a line 50 past a disconnectable coupling to a suitable oil discharge line and thence to a collector or reservoir.

The whole is contained upon a suitable support, or preferably within a suitable housing H. The housing in such an instance constitutes the support, and where a housing is referred to it is recognized that it may not be a complete enclosure, but merely a support for the component parts of the system. Within such a housing are carried all the necessary elements of such a system, collected at one place, and connected by short lines not easily ruptured, and easily inspected, the whole being removable and replaceable as a unit. Such a housing is shown in Figure 1, let into a space adjacent the pilot's compartment 90, supported from the structure by vibrationproof mountings (not shown), and so arranged that it may be readily inspected, disconnected, and removed, and replaced by one which has been tested and found to be workable, both as to its individual components and as a complete system.

The ease by which such a system may be protected against destructive vibration is a distinct advantage of this arrangement. While all individual parts may be individually so mounted, this increases the complexity of the former system, and its weight, and introduces undesirable factors arising from the likelihood that different but adjacent and connected parts are so mounted that their periods of vibration are unlike.

Figure 2:
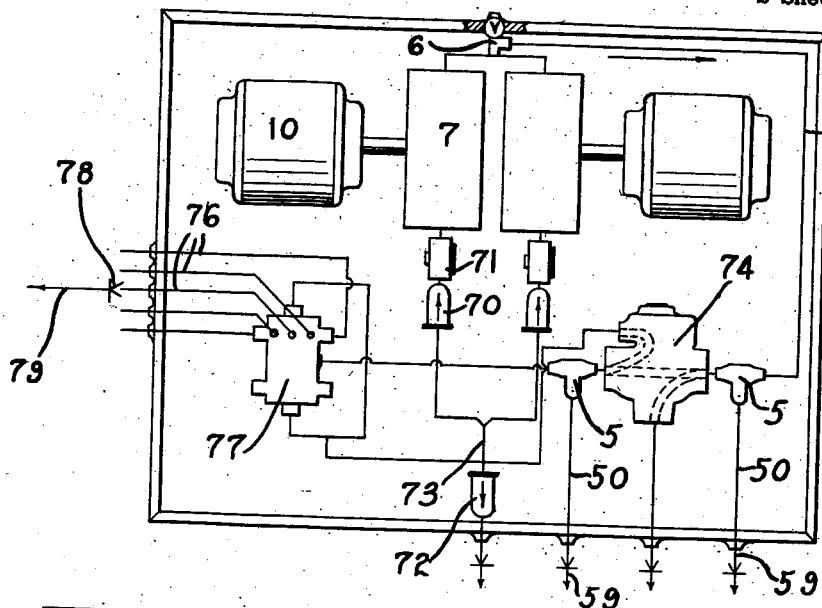
Figure 2 is a diagram of a system arranged for positive pressure operation alone.

Similarly there is shown in Figure 2 a pressure system, alone. The pump 7 is driven by a motor 10 to develop air pressure in a conduit 75, leading eventually to discharge lines 76 for connection to the individual distribution lines 79 installed upon the aircraft, past suitable couplings, as indicated at 78. Associated with the pump 7 or built into it are the pump check valve 70 and relief valve 71. This system also employs dual pumps and motors, and the two are joined in a common supply line 73, past a system check valve 72. The pressure conduit 75 extends through a manually operable on-off control valve 74, so located, and therefore requiring the location of the system as a whole, for convenient operation by the pilot or by the engineer officer through direct or remote control means. There is further included in the system an automatic distribution valve 77, which may be driven from an electric motor incorporated within its casing. As in the vacuum system, oil separators 5 may be employed, with their oil discharge lines 50 connected separably, when required, to oil discharge lines 59 installed upon the aircraft. A test T and test cock are installed at the outlet of the air pump 7, as indicated at 6, and this, like the manual control valve 74, should be located conveniently for operation by the pilot or engineer officer. The whole is enclosed within the housing H, mounted as previously described.

The operation of the pressure system, shown in Figure 2, is not different from systems as now installed, but with the parts separated and scattered. The pump 7, drawing air through the check valve 72 and conduit 73, delivers air under pressure to the conduit 75, and a test may be made to see if the pump is functioning properly at the test T and cock 6. From the conduit 75 the air under pressure passes the control valve 74, and is delivered to the distributor valve 77, whence it passes by the individual lines 76 to the individual distribution lines 79. The valve 77, being motor-driven, automatically controls the periodical expansion and deflation of the individual deicer boots.

As with the vacuum system, it is evident that the pressure system just described may be readily connected into the distribution system as installed on the aircraft, and can be easily disconnected and removed for test or for repair, and a new, fully tested system may be installed, with the knowledge that it will function properly when installed, since there are no parts which can fail to function, or which have not been coordinated with other parts of the system. Also it is evident that all couplings, joints, and the like, between individual parts are within the housing, protected by the vibration-proof mounting of the whole against the likelihood of failure, and that the joints and lines not so protected are kept to a minimum.

Figure 4:
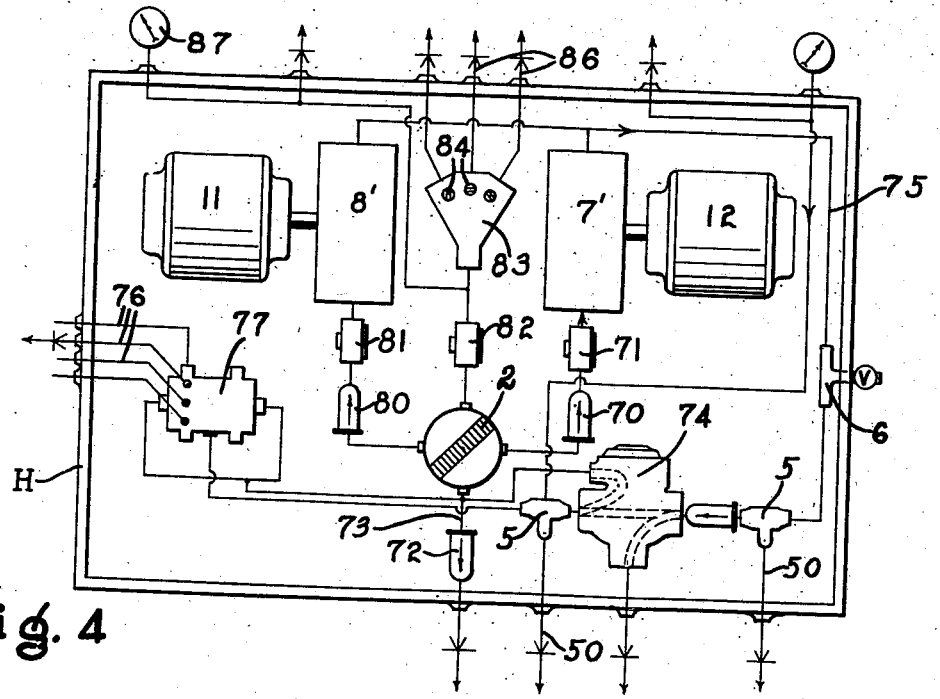
Figure 4 is a similar diagram of a combined pressure-vacuum system.

It is also possible to combine the pressure and the vacuum system into a single system, and to install this combined system in the same manner. Such an arrangement is shown in Figure 4. Here both of the two pumps may function alternatively as a pressure pump or as a vacuum pump, but normally one operates as a vacuum and the other as a pressure pump; through interconnection of pressure lines the vacuum pump normally assists the pressure pump. If, however, one pump should fail, let us say the pressure pump, this will harm nothing unless icing conditions are met, and even so, the vacuum pump delivers pressure to the pressure line. The vacuum-operated instrumentalities will continue to function under the influence of the vacuum pump, which is still in operation. If, however, icing conditions are met, the operative pump may be converted to pressure operation, and the suction side thereof is connected to the vacuum system, so that the latter will not cease to function. The single pump and its motor may be operating close to its capacity under such conditions, but this is temporary only, and of secondary importance at such times. Should the vacuum pump fail, with the pressure pump still in operating condition but not required because of the absence of icing conditions, the idle pressure pump may be converted into a vacuum pump and can be operated to evacuate the vacuum system, still being available for pressure supply if needed.

Thus the motor 11 drives a vacuum pump 8', and the motor 12 a pressure pump 7'. The systems are much the same as those previously described for the individual systems alone, with the exception that a selector valve 2 is provided to govern which of the pumps is to operate for pressure and which for vacuum. The discharge of the vacuum pump, however, is connected to the pressure line 75 of the system, instead of being separately discharged. This is largely immaterial, though it is desirable because of the necessity of being able to use the pumps interchangeably as suction pumps or pressure pumps, when required.

While the systems described have been designed as the sole operating unit, and while stand-by motors have been provided primarily for emergency use, it is to be remembered that such units may be employed in addition to the normal, scattered systems now commonly used, so that the unit of this invention constitutes in itself a reliable stand-by system, for use only in case of failure of the other system (in which case self-contained stand-by motors may be eliminated), or the present unit may constitute the normal system, the scattered system being retained for possible emergency use. The specific form of the prime movers 1 or 10, or of the driven units 7 or 8, likewise may vary with different installations, and the showing and description are intended to disclose generically any suitable form of prime mover and of driven unit, or any suitable arrangement or connection of a driving and a driven element, without restriction, in such a system.

What we claim as our invention is:

1. A pumping assembly for detachable connection with a distributing system, comprising a support, means to create a pressure differential, distributing head means, interconnecting means associated with said differential pressure creating means and said distributing head means, said interconnecting means including valve means to control the flow through said differential pressure creating means, and conduit means from the distributing head means terminating at the confines of said support in disconnectible couplings, all of said means being carried on said support.

2. A pumping assembly for detachable connection with a distributing system, comprising a support, means to create a pressure differential, distributing valve means, means interconnecting said differential pressure creating means and said distributing valve means, check valve means and relief valve means connected in the intake to said pressure differential creating means to control the flow through the pressure differential creating means, and conduit means from the distributing valve means terminating at the confines of said support in disconnectible couplings, all of said means being carried on said support.

3. A pumping assembly for detachable connection with a distributing system, comprising a support, pressure pump means, power means to drive said pressure pump means, automatic distributor valve means having a plurality of outlets, conduit means interconnecting said pressure pump means and said distributor valve means, and conduit means from the distributing valve means terminating at the confines of said support in disconnectible couplings, all of said means being carried on said support.

4. A pumping assembly for detachable connection with a distributing system, comprising a support, vacuum pump means, power means to drive the vacuum pump means, distributing head means having a plurality of outlets, valve means for controlling the several distributing head means outlets independently, conduit means interconnecting said vacuum pump means and said distributing head means, and conduit means extending from each outlet of said distributing head means and terminating at the confines of said support in disconnectible couplings, all of said means being carried on said support.

5. A pumping assembly for detachable connection with a distributing system comprising a support, pump means to create a pressure differential, vacuum distributing head means having a plurality of outlets, conduit means connecting said vacuum distributing head means to the intake side of said pump means, automatic pressure distributor valve means having a plurality of outlets, conduit means connecting the delivery side of said pump means to said automatic distributor valve means, and conduit means from the several outlets of the vacuum distributing head means and from the automatic pressure distributor valve means terminating at the confines of said support in disconnectible couplings, all of said means being carried on said support.

6. A pumping assembly for detachable connection with a distributing system comprising a support, pump means to create a pressure differential, vacuum distributing means having a plurality of outlets and incorporating valve means operable to control such outlets individually, interconnecting means connecting said vacuum distributing head means with the intake of said pump means, said interconnecting means including valve means to control flow through said pump means, automatic pressure distributor valve means having a plurality of outlets, conduit means connecting the outlet of said pump means with said automatic pressure distributor valve means, and conduit means from the several outlets of said vacuum distributing head means and said automatic pressure distributor valve means terminating at the confines of said support in disconnectible couplings, all of said means being carried on said support.

7. The combination of claim 6, additional pump means, and selector valve means operable to afford communication between the vacuum distributing head means and one or the other pumping means, such additional pump means and selector valve means also being carried on said support.

8. A pumping assembly for detachable connection with a distributing system comprising a support, means to create a pressure differential, distributing valve means, means interconnecting said differential pressure creating means and said distributing valve means, conduit means from the distributing valve means and said interconnecting means extending to the confines of said support and terminating in disconnectible couplings, said distributing valve means being operable to control the amount of flow through said conduit means, and all of said means being carried on said support.

EDWARD C. WELLS.
WELLWOOD E. BEALL.